US012222636B2

(12) United States Patent
Amano et al.

(10) Patent No.: US 12,222,636 B2
(45) Date of Patent: Feb. 11, 2025

(54) PROJECTION LENS AND PROJECTION DEVICE

(71) Applicant: FUJIFILM Corporation, Tokyo (JP)

(72) Inventors: Masaru Amano, Saitama (JP); Hironobu Kayano, Saitama (JP)

(73) Assignee: FUJIFILM Corporation, Tokyo (JP)

(*) Notice: Subject to any disclaimer, the term of this patent is extended or adjusted under 35 U.S.C. 154(b) by 649 days.

(21) Appl. No.: 17/515,816

(22) Filed: Nov. 1, 2021

(65) Prior Publication Data

US 2022/0050368 A1 Feb. 17, 2022

Related U.S. Application Data

(63) Continuation of application No. PCT/JP2020/016198, filed on Apr. 10, 2020.

(30) Foreign Application Priority Data

May 17, 2019 (JP) ................................ 2019-094102

(51) Int. Cl.
*G03B 21/14* (2006.01)
*G02B 7/02* (2021.01)
*G03B 21/28* (2006.01)

(52) U.S. Cl.
CPC ........... *G03B 21/145* (2013.01); *G02B 7/021* (2013.01); *G03B 21/28* (2013.01)

(58) Field of Classification Search
CPC ....... G03B 21/145; G03B 21/28; G02B 7/021
(Continued)

(56) References Cited

U.S. PATENT DOCUMENTS

2006/0028738 A1 2/2006 Kreitzer et al.
2006/0055907 A1 3/2006 Kato et al.
(Continued)

FOREIGN PATENT DOCUMENTS

CN 1573404 A 2/2005
CN 105403975 A 3/2016
(Continued)

OTHER PUBLICATIONS

JPO 2019002969—English translation—Okubo.*
(Continued)

*Primary Examiner* — Sharrief I Broome
(74) *Attorney, Agent, or Firm* — Birch, Stewart, Kolasch & Birch, LLP (57) ABSTRACT

A projection lens, which is mounted on a housing of a projection device including an electro-optical element, includes a first holding part that holds a first optical system disposed along a first optical axis along which light emitted from the housing passes, a first reflective part that bends light parallel to the first optical axis to form light parallel to a second optical axis, a second reflective part that bends light parallel to the second optical axis to form light parallel to a third optical axis, and a second holding part holds the first reflective part and the second reflective part. A distance along the first optical axis between a first lens, which is made of glass and is disposed to be closest to a reduction side in the first optical system, and the first reflective part is longer than a distance along the second optical axis between the first reflective part and the second reflective part. The first optical system includes an aspherical third lens that is made of a resin material and is disposed between the first lens and the first reflective part.

20 Claims, 6 Drawing Sheets

(58) Field of Classification Search
USPC .......................................................... 359/649
See application file for complete search history.

(56) References Cited

U.S. PATENT DOCUMENTS

| | | | |
|---|---|---|---|
| 2010/0140459 A1* | 6/2010 | Tatsuzawa | G02B 13/005 |
| | | | 359/896 |
| 2013/0088789 A1* | 4/2013 | Yanagisawa | G02B 13/0045 |
| | | | 359/715 |
| 2015/0070778 A1 | 3/2015 | Amano | |
| 2016/0091700 A1* | 3/2016 | Takano | G02B 13/0065 |
| | | | 359/364 |
| 2018/0033123 A1 | 2/2018 | Narimatsu et al. | |
| 2018/0074302 A1* | 3/2018 | Takano | G02B 15/1421 |
| 2018/0217489 A1* | 8/2018 | Kuroda | G02B 7/02 |
| 2018/0307015 A1 | 10/2018 | Amano | |
| 2019/0025679 A1 | 1/2019 | Kuroda | |
| 2019/0072838 A1* | 3/2019 | Toyoda | G02B 15/1465 |
| 2019/0086783 A1* | 3/2019 | Kuroda | G02B 27/0955 |
| 2019/0219802 A1 | 7/2019 | Kuroda | |
| 2019/0331901 A1* | 10/2019 | Minefuji | G02B 17/08 |

FOREIGN PATENT DOCUMENTS

| | | |
|---|---|---|
| CN | 205485027 U | 8/2016 |
| JP | 2005-309251 A | 11/2005 |
| JP | 2007-94242 A | 4/2007 |
| JP | 2013-15853 A | 1/2013 |
| JP | 2013-61375 A | 4/2013 |
| JP | 2014-56136 A | 3/2014 |
| JP | 2018-21943 A | 2/2018 |
| JP | 6378448 B2 | 8/2018 |
| JP | 2019-2969 A | 1/2019 |
| JP | O 2019002969 * | 1/2019 ............ G03B 21/14 |
| WO | WO 2013/171995 A1 | 11/2013 |
| WO | WO 2017/169003 A1 | 10/2017 |
| WO | WO 2018/055963 A1 | 3/2018 |

OTHER PUBLICATIONS

Chinese Office Action and Search Report for corresponding Chinese Application No. 202080034203.6, dated Nov. 7, 2023, with English translation.

International Preliminary Report on Patentability and Written Opinion of the International Searching Authority for International Application No. PCT/JP2020/016198, dated Dec. 2, 2021, with an English translation.

International Search Report for International Application No. PCT/JP2020/016198, dated Jun. 16, 2020, with an English translation.

* cited by examiner

| CONDITIONAL EXPRESSION OF FOCAL LENGTH OF LENS L15 (THIRD LENS) |
| --- |
| FOCAL LENGTH f3 OF LENS L15 (THIRD LENS) $$\|1/f3\| \leq 0.03$$ |

FIG. 6

| CONDITIONAL EXPRESSIONS OF FOCAL LENGTHS OF LENS L16 (SECOND LENS) AND LENS L15 (THIRD LENS) |
| --- |
| FOCAL LENGTH f2 OF LENS L16 (SECOND LENS)<br>FOCAL LENGTH f3 OF LENS L15 (THIRD LENS) $$\|1/f3\| < \|1/f2\|$$ |

FIG. 7

PROJECTION LENS AND PROJECTION DEVICE

CROSS-REFERENCE TO RELATED APPLICATIONS

This application is a continuation application of International Application No. PCT/JP2020/016198 filed Apr. 10, 2020, the disclosure of which is incorporated herein by reference in its entirety. Further, this application claims priority from Japanese Patent Application No. 2019-094102 filed on May 17, 2019, the disclosure of which is incorporated herein by reference in its entirety.

BACKGROUND

1. Technical Field

The technique of the present disclosure relates to a projection lens and a projection device.

2. Description of the Related Art

A projection lens disclosed in JP6378448B comprises a first optical system, a first optical axis-bending member, a second optical system, a second optical axis-bending member, a first holding member, a second holding member, a first bonding surface, a second bonding surface, and a bonding part.

In JP6378448B, the first optical axis-bending member is disposed between the first optical system and an imaging plane on which an image is formed by the first optical system, and bends an optical axis. The second optical system projects the image, which is formed by the first optical system, on a projection surface. The second optical axis-bending member is disposed in the second optical system, and bends an optical axis. The first holding member integrally holds the first optical system and the first optical axis-bending member. The second holding member integrally holds the second optical system and the second optical axis-bending member. The first bonding surface is formed on the first holding member so as to cross an emission-side optical axis of the first optical system. The second bonding surface is formed on the second holding member so as to cross an incident-side optical axis of the second optical system. The bonding part is adapted so that at least one of the first holding member or the second holding member can be shifted relative to the other thereof in an in-plane direction of the first and second bonding surfaces and can be rotated about the optical axis in a state where the first and second bonding surfaces are combined with each other; and the emission-side optical axis of the first optical system and the incident-side optical axis of the second optical system are combined with each other to form a U-shaped optical path.

SUMMARY

An embodiment according to the technique of the disclosure provides a projection lens and a projection device that can be reduced in size.

A projection lens according to an aspect of the disclosure is a projection lens that is mounted on a housing of a projection device including an electro-optical element. The projection lens comprises a first holding part that holds a first optical system disposed along a first optical axis along which light emitted from the housing passes, a first reflective part that bends light parallel to the first optical axis to form light parallel to a second optical axis, a second reflective part that bends the light parallel to the second optical axis to form light parallel to a third optical axis, and a second holding part holds the first reflective part and the second reflective part. A distance along the first optical axis between a first lens, which is disposed to be closest to a reduction side in the first optical system, and the first reflective part is longer than a distance along the second optical axis between the first reflective part and the second reflective part; the first lens is a lens made of glass; and the first optical system includes an aspherical third lens that is made of a resin material and is disposed between the first lens and the first reflective part.

It is preferable that a diameter of an optical surface of the third lens is 1.3 to 2 times a diameter of an optical surface of the first lens.

It is preferable that the first optical system forms an intermediate image of an optical image of the electro-optical element.

It is preferable that the first optical system includes a second lens disposed to be closest to an enlargement side and |1/f3| is smaller than |1/f2| in a case where a focal length of the second lens is denoted by f2 and a focal length of the third lens is denoted by f3. Further, it is preferable that |1/f3| is 0.03 or less in a case where a focal length of the third lens is denoted by f3.

It is preferable that the first optical system includes a second lens disposed to be closest to an enlargement side and the second lens and the third lens are adjacent to each other.

It is preferable that the first optical system includes a second lens disposed to be closest to an enlargement side and a diameter of an optical surface of the third lens is larger than a diameter of an optical surface of the first lens and is smaller than a diameter of an optical surface of the second lens.

It is preferable that the first optical system includes a stop portion disposed between the first lens and the third lens and a distance between the stop portion and the third lens is longer than a distance between the stop portion and the first lens.

It is preferable that the second holding part includes one holding frame integrally holding the first reflective part and the second reflective part.

It is preferable that the projection lens further comprises a second holding part-fixing mechanism fixing the second holding part to the first holding part and the second holding part is capable of being shifted relative to the first holding part in a case where a fixing force of the second holding part-fixing mechanism is reduced.

It is preferable that the second holding part-fixing mechanism includes a male screw, a female screw which engages with the male screw, and a screw insertion hole into which the male screw is inserted, the female screw is formed in any one of the first holding part or the second holding part, and the screw insertion hole is formed in the other thereof.

A projection device according to another aspect of the disclosure comprises any one of the projection lenses, the electro-optical element, and the housing.

BRIEF DESCRIPTION OF THE DRAWINGS

Exemplary embodiments according to the technique of the present disclosure will be described in detail based on the following figures, wherein.

DETAILED DESCRIPTION

An example of an embodiment of a technique of the disclosure will be described below with reference to the drawings. Terms, such as "first", "second", and "third", used in this specification are added to avoid the confusion of components and do not limit the number of components present in a projection device or a projection lens.

Figure 1:
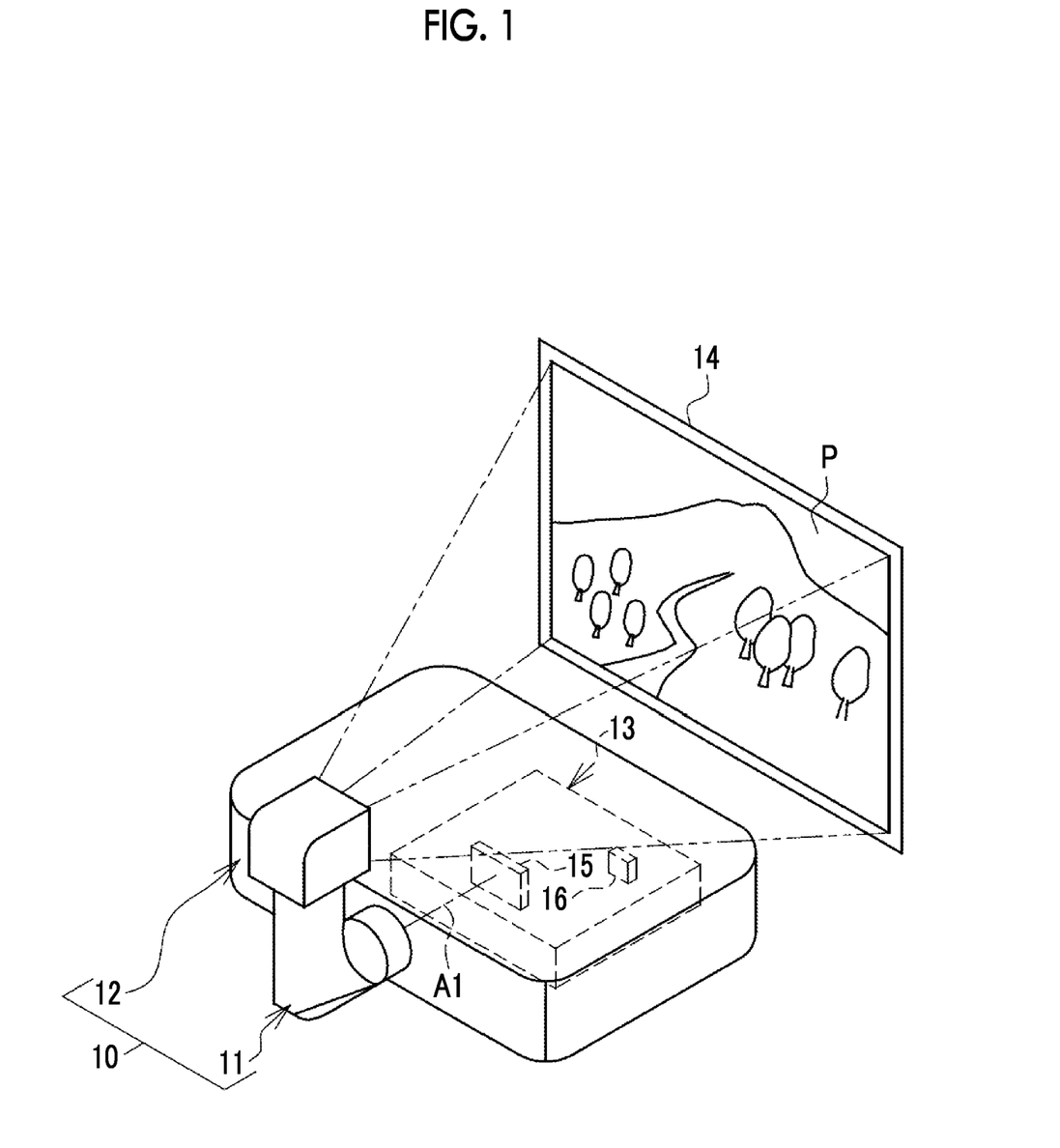
FIG. 1 is a diagram showing a projector comprising a projection lens.

As shown in FIG. 1, a projector 10 is an example of "projection device" according to the technique of the disclosure, and comprises a projection lens 11 and a body part 12. The body part 12 is an example of "housing" according to the technique of the disclosure. One end portion of the projection lens 11 is mounted on the body part 12. The body part 12 houses main components, such as an image forming unit 13 and a control board.

The image forming unit 13 forms an image that is to be projected on a screen 14 through the projection lens 11. The image forming unit 13 comprises an image forming panel 15, a light source 16, a light guide member (not shown), and the like. The light source 16 applies light to the image forming panel 15. The light guide member guides light, which is applied from the light source 16, to the image forming panel 15.

The image forming unit 13 is, for example, a reflective type image forming unit that uses a digital micromirror device (DMD: registered trademark) as the image forming panel 15. As well known, the DMD is an image display element which includes a plurality of micromirrors capable of changing the reflection direction of light applied from the light source 16 and in which the respective micromirrors are two-dimensionally arranged in pixels. The DMD performs optical modulation corresponding to an image by changing the direction of each micromirror according to the image to switch the ON/OFF of reflected light of light applied from the light source 16. The image forming panel 15 is an example of "electro-optical element" according to the technique of the disclosure.

Examples of the light source 16 include a white light source. The white light source emits white light. The white light source is, for example, a light source that is realized from the combination of a laser light source and a phosphor. The laser light source emits blue light to the phosphor as excitation light. The phosphor emits yellow light in a case where the phosphor is excited by blue light emitted from the laser light source. The white light source emits white light by combining blue light that is emitted from the laser light source with yellow light that is emitted from the phosphor. The image forming unit 13 is further provided with a rotary color filter that selectively converts white light emitted from the light source 16 into each of blue light B (Blue), green light G (Green), and red light R (Red) in a time-sharing manner. Each of blue light B, green light G, and red light R is selectively applied to the image forming panel 15, so that image light where image information about each of blue light B, green light G, and red light R is carried and supported is obtained. Each color image light obtained in this way is selectively incident on the projection lens 11, so that each color image light is projected toward the screen 14. The respective color image lights are integrated with each other on the screen 14. Accordingly, a full color image P is displayed on the screen 14.

Luminous flux representing an image formed by the image forming unit 13 is incident on the projection lens 11 from the body part 12. The projection lens 11 enlarges image light, which is based on the incident luminous flux, by an optical system and forms an image. Accordingly, the projection lens 11 projects the image P, which is the enlarged image of the image formed by the image forming unit 13, on the screen 14.

Figure 2:
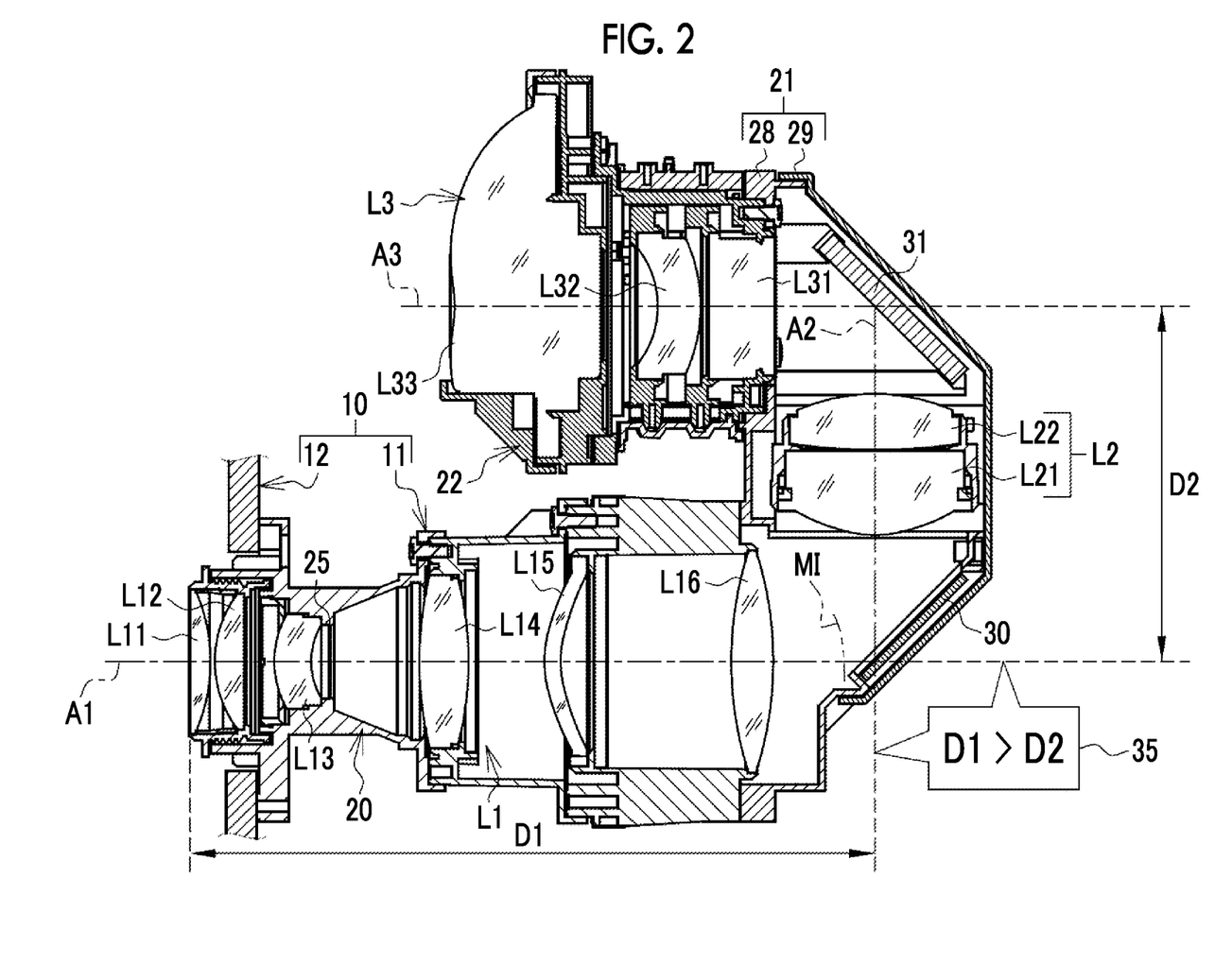
FIG. 2 is a cross-sectional view of the projection lens.

As shown in FIG. 2, the projection lens 11 comprises a bending optical system. The bending optical system has a first optical axis A1, a second optical axis A2, and a third optical axis A3. The first optical axis A1 is an optical axis along which light emitted from the body part 12 passes. The second optical axis A2 is an optical axis that is bent at an angle of 90° from the first optical axis A1. The third optical axis A3 is an optical axis that is bent at an angle of 90° from the second optical axis A2. FIG. 2 shows the projection lens 11 from which an exterior cover is removed.

The projection lens 11 includes a first holding part 20, a second holding part 21, and a third holding part 22. The respective holding parts 20 to 22 hold lenses, respectively. The lenses held by the first holding part 20 are arranged on the first optical axis A1, the lenses held by the second holding part 21 are arranged on the second optical axis A2, and the lenses held by the third holding part 22 are arranged on the third optical axis A3. A central axis of the first holding part 20 substantially coincides with the first optical axis A1, a central axis of the second holding part 21 substantially coincides with the second optical axis A2, and a central axis of the third holding part 22 substantially coincides with the third optical axis A3. In this embodiment, in order to simplify description, the detailed configuration of the respective lenses will be omitted and each of the lenses will be represented as one lens. However, each lens may be a plurality of lenses.

The first holding part 20 is positioned to be closest to an incident side, and the third holding part 22 is positioned to be closest to an emission side. The second holding part 21 is positioned between the first holding part 20 and the third holding part 22. In the following description, the incident side may be referred to as a reduction side, and the emission side may be referred to as an enlargement side.

The first holding part 20 holds a first optical system L1. The first optical system L1 is composed of, for example, a lens L11, a lens L12, a lens L13, a lens L14, a lens L15, and a lens L16, and is disposed along the first optical axis A1. Further, a stationary stop 25 is provided between the lenses L13 and L14 in the first holding part 20. The stationary stop 25 narrows luminous flux incident from the body part 12.

The lens L11 is disposed to be closest to the reduction side in the first optical system L1. That is, the lens L11 is an example of "first lens" according to the technique of the disclosure.

The first optical system L1 forms an intermediate image MI of an optical image of the image forming panel 15. For this reason, the lens L16, which is disposed immediately behind the imaging position of the intermediate image MI on the reduction side and is disposed to be closest to the enlargement side in the first optical system L1, is an example of "second lens" according to the technique of the disclosure.

The lenses L15 and L16 are adjacent to each other. The lens L15 is an aspherical lens that is disposed to be closer to the reduction side than the lens L16 and is made of a resin material. That is, the lens L15 is an example of "third lens" according to the technique of the disclosure. The lens L15 functions as a correction lens for correcting a field curvature and the like. Lenses, which include lenses of second and third optical systems L2 and L3 to be described later other than the lens L15, are lenses made of glass.

Figure 3:
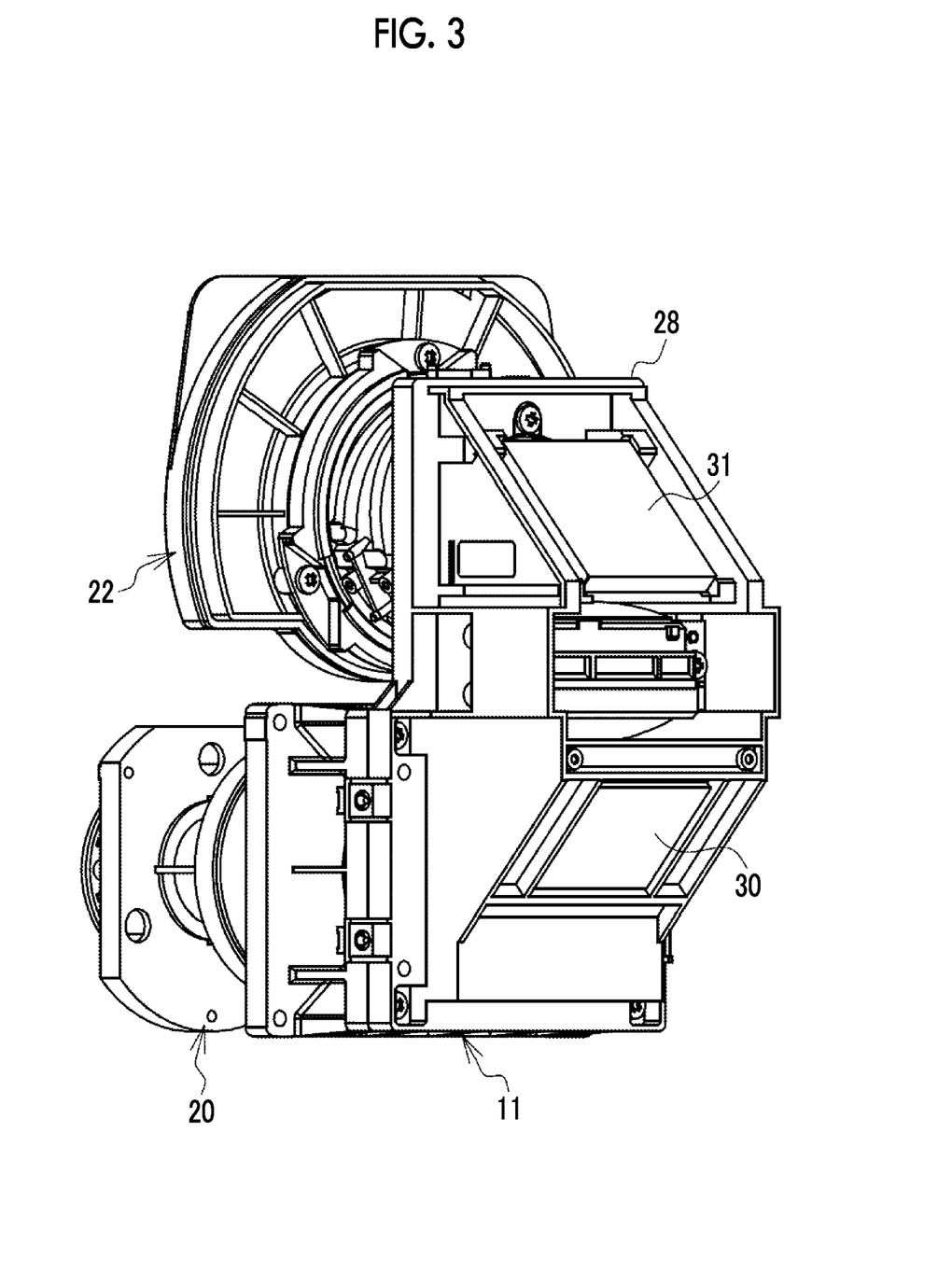
FIG. 3 is a perspective view of the projection lens.

The second holding part 21 includes a holding frame 28 and a cover 29. As shown also in FIG. 3 showing a state where the cover 29 is removed, the holding frame 28 integrally holds a first mirror 30 and a second mirror 31. The cover 29 has a light shielding property and covers the back side of the holding frame 28.

Each of the first and second mirrors 30 and 31 is one of optical elements composing the bending optical system and bends an optical axis. The first mirror 30 bends light parallel to the first optical axis A1 to form light parallel to the second optical axis A2. The second mirror 31 bends light parallel to the second optical axis A2 to form light parallel to the third optical axis A3. That is, the first mirror 30 is an example of "first reflective part" according to the technique of the disclosure, and the second mirror 31 is an example of "second reflective part" according to the technique of the disclosure.

The first mirror 30 is held in an attitude where a reflective surface forms an angle of 45° with respect to each of the first optical axis A1 and the second optical axis A2. Likewise, the second mirror 31 is held in an attitude where a reflective surface forms an angle of 45° with respect to each of the second optical axis A2 and the third optical axis A3. Each of the first and second mirrors 30 and 31 is a specular reflective type mirror of which a transparent member, such as glass, is coated with a reflective film.

The intermediate image MI is formed to be closer to the reduction side than a second optical system L2, for example, to be closer to the reduction side than the first mirror 30. In other words, the intermediate image MI is formed at a position between the lens L16 and the first mirror 30.

The second holding part 21 holds a second optical system L2. The second optical system L2 is composed of, for example, a lens L21 and a lens L22 and is disposed along the second optical axis A2. In this example, the second optical system L2 functions as a relay lens. More specifically, the second optical system L2 uses the intermediate image MI, which is formed by the first optical system L1, as a subject and relays the luminous flux representing the intermediate image MI to the third holding part 22.

The third holding part 22 holds a third optical system L3. The third optical system L3 is an emission optical system, is composed of, for example, a lens L31, a lens L32, and a lens L33, and is disposed along the third optical axis A3. The lens L33 is a lens that is disposed to be closest to the enlargement side in the third optical system L3, and is a so-called emission lens.

A distance D1 along the first optical axis A1 between the lens L11 and the first mirror 30 is longer than a distance D2 along the second optical axis A2 between the first mirror 30 and the second mirror 31 (D1>D2; see a balloon 35). The distance D1 is, more exactly, an interval along the first optical axis A1 between the incident surface of the lens L11 and the reflective surface of the first mirror 30. Likewise, the distance D2 is, more exactly, an interval along the second optical axis A2 between the reflective surface of the first mirror 30 and the reflective surface of the second mirror 31.

Figure 4:
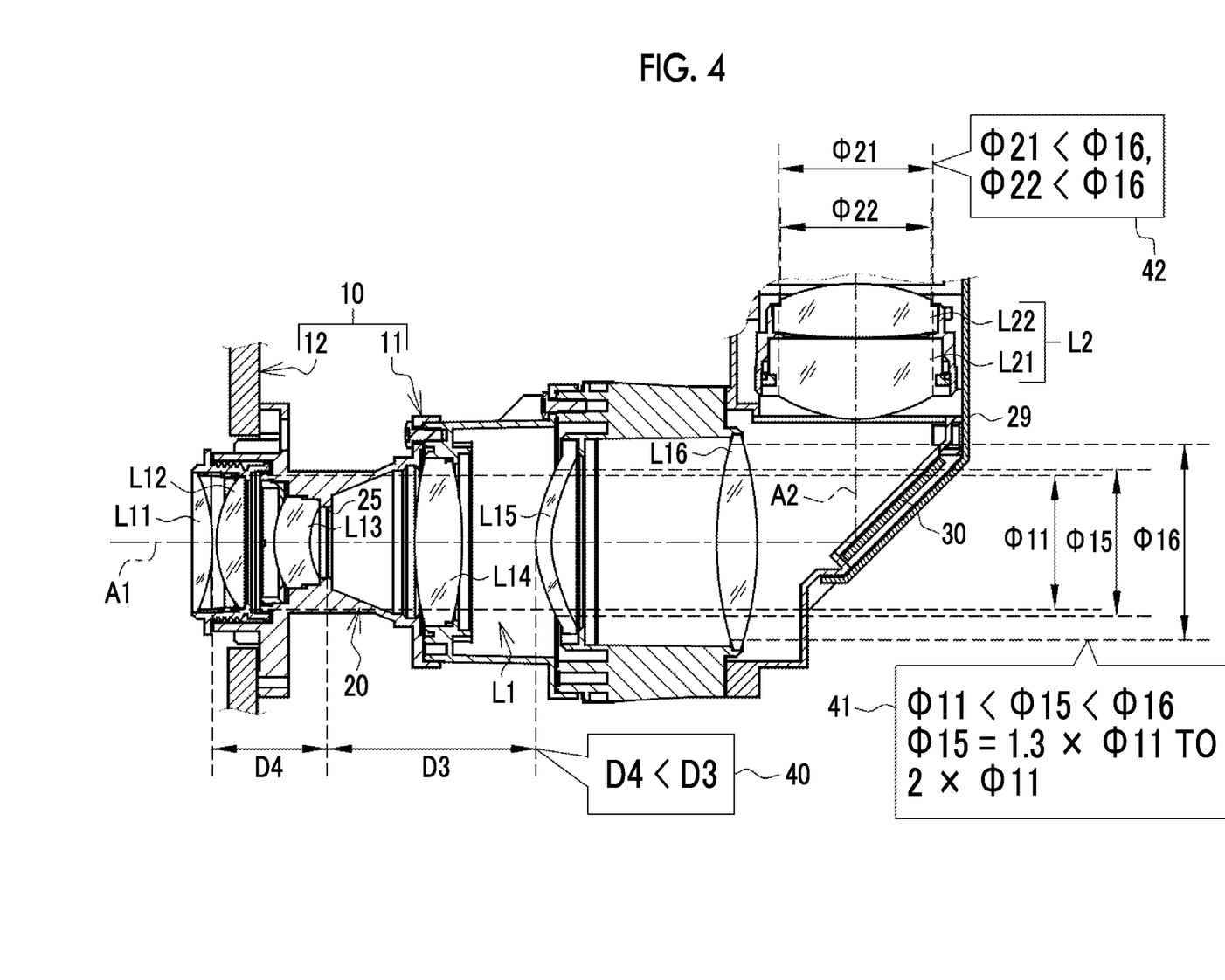
FIG. 4 is a cross-sectional view of a main portion of the projection lens.

In FIG. 4, a distance D3 between the stationary stop 25 and the lens L15 is longer than a distance D4 between the stationary stop 25 and the lens L11 (D4<D3; see a balloon 40). The distance D3 is, more exactly, an interval along the first optical axis A1 between the stationary stop 25 and the incident surface of the lens L15. Likewise, the distance D4 is, more exactly, an interval along the first optical axis A1 between the stationary stop 25 and the emission surface of the lens L11.

A diameter $\Phi15$ of the optical surface of the lens L15 is larger than a diameter $\Phi11$ of the optical surface of the lens L11 and is smaller than a diameter $\Phi16$ of the optical surface of the lens L16 ($\Phi11<\Phi15<\Phi16$; see a balloon 41). Further, the diameter $\Phi15$ of the optical surface of the lens L15 is 1.3 to 2 times the diameter $\Phi11$ of the optical surface of the lens L11 ($\Phi15=1.3\times\Phi11$ to $2\times\Phi11$; see the balloon 41). The diameter of the optical surface is a diameter of a circular region of each lens through which a ray can pass in a state where the optical system is held by each holding part.

Further, the diameter $\Phi16$ of the optical surface of the lens L16 is largest among the diameters of the optical surfaces of the respective lenses composing the first optical system L1.

A diameter $\Phi21$ of the optical surface of the lens L21 composing the second optical system L2 and a diameter $\Phi22$ of the optical surface of the lens L22 are smaller than the diameter $\Phi16$ of the optical surface of the lens L16 ($\Phi21<\Phi16$ and $\Phi22<\Phi16$; see a balloon 42).

Figure 5:
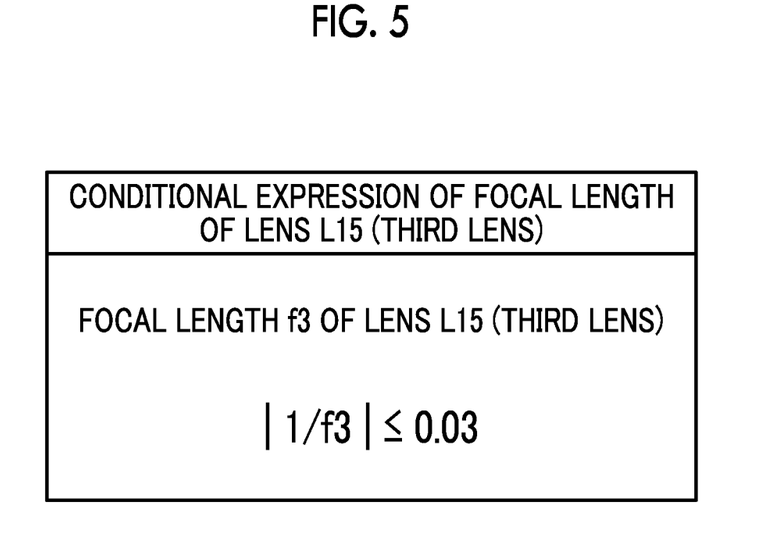
FIG. 5 is a diagram showing a focal length condition of a third lens.
Figure 6:
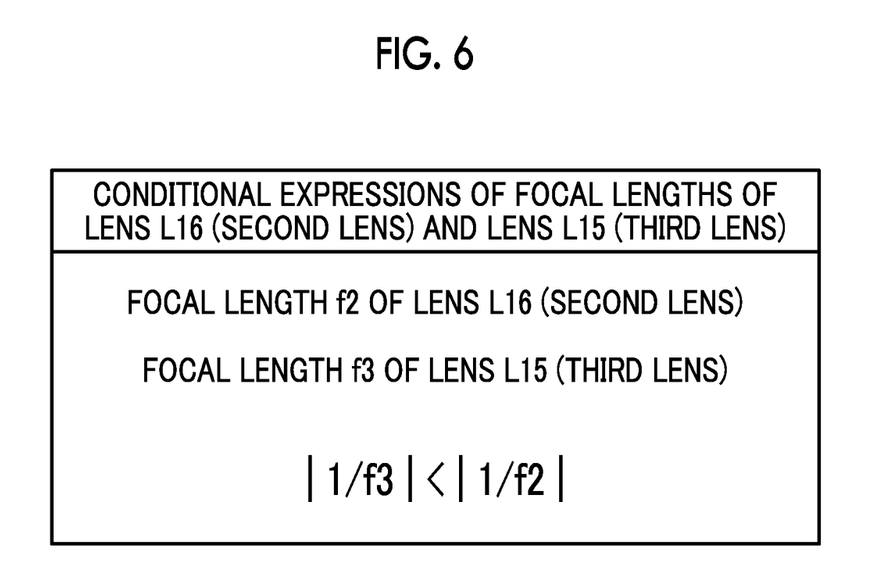
FIG. 6 is a diagram showing a focal length condition of a second lens and a third lens.

As shown in FIG. 5, in a case where a focal length of the lens L15 is denoted by f3, $|1/f3|$ is 0.03 or less ($|1/f3|\leq0.03$). More preferably, $|1/f3|$ is smaller than 0.025 ($|1/f3|<0.025$). Further, as shown in FIG. 6, in a case where a focal length of the lens L16 is denoted by f2, $|1/f3|$ is smaller than $|1/f2|$ ($|1/f3|<|1/f2|$).

Furthermore, although not shown, $|1/f2|$ is 0.025 or more and 0.1 or less ($0.025\leq|1/f2|\leq0.1$). More preferably, $|1/f2|$ is larger than 0.03 and 0.1 or less ($0.03<|1/f2|\leq0.1$).

Figure 7:
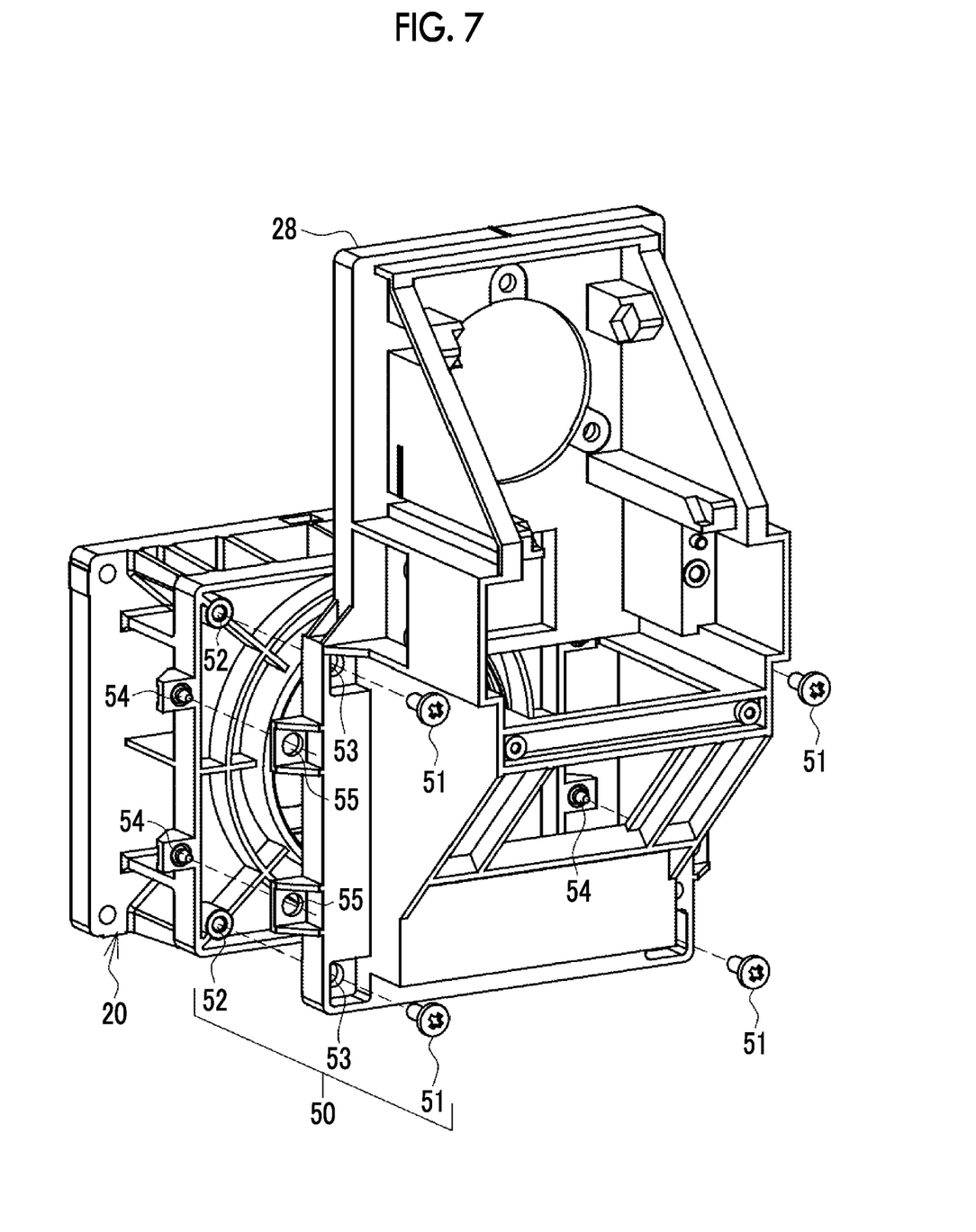
FIG. 7 is an exploded perspective view of a first holding part and a holding frame.

In FIG. 7, a lower portion of the holding frame 28 forming the second holding part 21 is fixed to the first holding part 20 by a second holding part-fixing mechanism 50. The second holding part-fixing mechanism 50 includes male screws 51, female screws 52 that engage with the male screws 51, and circular screw insertion holes 53 into which the male screws 51 are inserted. Sets of the male screw 51, the female screw 52, and the screw insertion hole 53 are provided at the positions of the respective corner of a substantially square shape one by one, that is, a total of four sets thereof are provided. The female screws 52 are formed in the first holding part 20, and the screw insertion holes 53 are formed in the holding frame 28. An inner diameter of the screw insertion hole 53 is larger than the outer diameter of a screw portion of the male screw 51.

Four protrusions 54 are formed on the first holding part 20 at positions symmetrical with each other. Four circular protrusion insertion holes 55 are formed in the holding frame 28 at positions facing the protrusions 54. The inner diameter of the protrusion insertion hole 55 is larger than the outer diameter of the protrusion 54.

In a case where the holding frame 28 is to be fixed to the first holding part 20, the holding frame 28 is united with the first holding part 20 first such that the protrusions 54 are inserted into the protrusion insertion holes 55. After that, the male screws 51 are inserted into the screw insertion holes 53, engage with the female screws 52, and are tightened.

In a state where the fastening between the male screws 51 and the female screws 52 is loosened, that is, a state where a fixing force of the second holding part-fixing mechanism 50 is reduced, the holding frame 28 can be shifted relative to the first holding part 20 by a difference in dimension between the inner diameter of the screw insertion hole 53 and the outer diameter of the screw portion of the male screw 51 and a difference in dimension between the inner diameter of the protrusion insertion hole 55 and the outer diameter of the protrusion 54. A state where the cover 29, the first mirror 30, and the second mirror 31 are removed is shown in FIG. 7.

Next, the action obtained from the above-mentioned configuration will be described. First, luminous flux representing an image formed by the image forming unit 13 is incident on the lens L11 of the first optical system L1 of the projection lens 11. Subsequently, the luminous flux passes through the lenses L12 and L13 and passes through the stationary stop 25, so that the amount of light is adjusted. The luminous flux of which the amount of light is adjusted by the stationary stop 25 passes through the lens L14 and further passes through the lens L15, so that a field curvature and the like is corrected.

The lens L15 is an aspherical lens made of a resin material. For this reason, the lens L15 is still more inexpensive than an aspherical lens made of glass. Further, a plurality of lenses, such as a combination of positive and negative lenses, is necessary to correct a field curvature and the like by a spherical lens made of glass. For this reason, it is not possible to avoid an increase in the distance D1 along the first optical axis A1, that is, an increase in the size of the first holding part 20. However, since a field curvature and the like are corrected by the aspherical lens L15 made of a resin material in this example, an increase in the size of the first holding part 20 is suppressed.

As shown in FIG. 4, the distance D3 between the stationary stop 25 and the lens L15 is set to be larger than the distance D4 between the stationary stop 25 and the lens L11. As described above, the lens L15 is disposed at a position relatively away from the stationary stop 25 where a temperature rises due to the collection of light. Accordingly, the lens L15 is less likely to be affected by the heat of the stationary stop 25. Therefore, it is possible to avoid a disadvantage that the projection lens 11 is out of focus due to the thermal deformation of the lens L15. Further, since the lens L15 is disposed relatively away from the stationary stop 25, an image height is increased in comparison with a case where the lens L15 is disposed to be relatively close to the stationary stop 25. Accordingly, since on-axis rays and off-axis rays are more dispersed, it is easy to appropriately correct a field curvature and the like.

Furthermore, as shown in FIG. 4, the diameter $\Phi15$ of the optical surface of the lens L15 is set to be larger than the diameter $\Phi11$ of the optical surface of the lens L11 and is set to be smaller than the diameter $\Phi16$ of the optical surface of the lens L16. Moreover, the diameter $\Phi15$ of the optical surface of the lens L15 is set to be 1.3 to 2 times the diameter $\Phi11$ of the optical surface of the lens L11. Accordingly, it is possible to avoid an unnecessary increase in the size of the first holding part 20 while appropriately correcting a field curvature and the like.

As shown in FIG. 5, in a case where the focal length of the lens L15 is denoted by f3, $|1/f3|$ is set to be 0.03 or less. Further, as shown in FIG. 6, in a case where the focal length of the lens L16 is denoted by f2, $|1/f3|$ is set to be smaller than $|1/f2|$. In a case where the optical power of the lens L15 is set to be very low in this way, the out-of-focus can be minimized even if the lens L15 is deformed due to heat or the like.

Luminous flux having passed through the lens L15 is incident on the lens L16. Then, the intermediate image MI is formed to be closer to the reduction side than the first mirror 30, that is, at a position between the lens L16 and the first mirror 30.

As shown in FIG. 2, the distance D1 along the first optical axis A1 between the lens L11 and the first mirror 30 is set to be longer than the distance D2 along the second optical axis A2 between the first mirror 30 and the second mirror 31. For this reason, the intermediate image MI can be formed not on the second optical axis A2 but on the first optical axis A1. Accordingly, the second optical system L2 can be adapted to be more compact than the first optical system L1, and the length of the second optical axis A2, that is, the second holding part 21 can be shortened. As a result, the size of the projection lens 11 and eventually the projector 10 can be reduced.

Luminous flux having passed through the lens L16 is bent at an angle of 90° by the first mirror 30 to form light parallel to the second optical axis A2, and passes through the second optical system L2.

As shown in FIG. 4, the diameter $\Phi21$ of the optical surface of the lens L21 composing the second optical system L2 and the diameter $\Phi22$ of the optical surface of the lens L22 are set to be smaller than the diameter $\Phi16$ of the optical surface of the lens L16. The reason for this is that the diameter $\Phi16$ of the optical surface of the lens L16 is set to be maximum among the diameters of the optical surfaces of the respective lenses composing the first optical system L1 and the intermediate image MI is formed on the first optical axis A1 by the first optical system L1. Accordingly, even though the diameter $\Phi21$ of the optical surface of the lens L21 and the diameter $\Phi22$ of the optical surface of the lens L22 are not increased, an enlarged image having a desired size is obtained. Since the diameter $\Phi21$ of the optical surface of the lens L21 and the diameter $\Phi22$ of the optical surface of the lens L22 are set to be smaller than the diameter $\Phi16$ of the optical surface of the lens L16, the second holding part 21 can be further reduced in size.

Luminous flux having passed through the second optical system L2 is bent at an angle of 90° again by the second mirror 31 to form light parallel to the third optical axis A3. Then, the light passes through the third optical system L3 and is projected on the screen 14 as the image P.

As shown in FIGS. 2 and 3, the second holding part 21 includes one holding frame 28 that integrally holds the first mirror 30 and second mirror 31. For this reason, component costs and assembly man-hours can be reduced in comparison with a case where the second holding part 21 includes two holding frames separately holding the first mirror 30 and the second mirror 31.

The projection lens includes the second holding part-fixing mechanism 50 for fixing the holding frame 28 (second holding part 21) to the first holding part 20 as shown in FIG. 7, and the holding frame 28 (second holding part 21) can be shifted relative to the first holding part 20 in a case where the fixing force of the second holding part-fixing mechanism 50 is reduced. Accordingly, after a relative positional relationship between the first optical system L1 and the first mirror 30 is finely adjusted, the second holding part 21 can be fixed to the first holding part 20.

Further, since the second holding part-fixing mechanism 50 includes the male screws 51, the female screws 52 that engage with the male screws 51, and the screw insertion holes 53 into which the male screws 51 are inserted, the second holding part 21 can be easily assembled with the first holding part 20.

In the embodiment, the female screws 52 are formed in the first holding part 20 and the screw insertion holes 53 are formed in the holding frame 28. However, on the contrary, the screw insertion holes 53 may be formed in the first holding part 20 and the female screws 52 may be formed in the second holding part 21. Furthermore, a method of fixing the second holding part 21 to the first holding part 20 is not limited to fastening using screws described in the embodiment, and well-known other fixing methods, such as rivets and adhesives, may be employed.

A transmission type image forming panel, which uses a liquid crystal display (LCD) instead of a DMD, may be used as the image forming panel 15. Alternatively, a panel using a self light-emitting element, such as a light emitting diode (LED) or organic electro luminescence (EL), instead of a DMD may be used. Alternatively, total reflective type mirrors may be used as the first and second reflective parts instead of specular reflective type first and second mirrors 30 and 31 of the embodiment.

An example where a laser light source is used as the light source 16 has been described in the embodiment, but the disclosure is not limited thereto. A mercury lamp, an LED, and the like may be used as the light source 16. Further, the blue laser light source and the yellow phosphor have been used in the embodiment, but the disclosure is not limited thereto. A green phosphor and a red phosphor may be used instead of the yellow phosphor. Furthermore, a green laser light source and a red laser light source may be used instead of the yellow phosphor.

In the technique of the disclosure, the above-mentioned various embodiments and various modification examples can also be appropriately combined. Further, it goes without saying that the disclosure is not limited to the embodiments and can employ various configurations without depart from a gist.

The description contents and shown contents having been described above are the detailed description of portions according to the technique of the disclosure, and are merely an example of the technique of the disclosure. For example, the description of the configuration, functions, actions, and effects having been described above is the description of examples of the configuration, functions, actions, and effects of the portions according to the technique of the disclosure. Accordingly, it goes without saying that unnecessary portions may be deleted or new elements may be added or replaced in the description contents and shown contents described above without departing from the scope of the technique of the disclosure. Further, the description of common technical knowledge and the like, which allow the technique of the disclosure to be embodied and do not need to be particularly described, is omitted in the description contents and shown contents, which have been described above, to avoid complication and to facilitate the understanding of portions according to the technique of the disclosure.

All documents, patent applications, and technical standards disclosed in this specification are incorporated in this specification by reference such that the incorporation of each of the documents, the patent applications, and the technical standards by reference is specific and is as detailed as that in a case where the documents, the patent applications, and the technical standards are described individually.

What is claimed is:

1. A projection lens that is mounted on a housing of a projection device including an electro-optical element, the projection lens comprising:
   a first holding part that holds a first optical system disposed along a first optical axis along which light emitted from the housing passes;
   a first reflective part that bends light parallel to the first optical axis to form light parallel to a second optical axis;
   a second reflective part that bends the light parallel to the second optical axis to form light parallel to a third optical axis; and
   a second holding part that holds the first reflective part and the second reflective part,
   wherein a distance along the first optical axis between a first lens, which is disposed to be closest to a reduction side in the first optical system, and the first reflective part is longer than a distance along the second optical axis between the first reflective part and the second reflective part,
   the first lens is a lens made of glass,
   the first optical system comprises a second lens disposed to be closest to an enlargement side of the first optical system, and
   the first optical system includes an aspherical third lens that is made of a resin material and is disposed between the first lens and the second lens, and adjacent to the second lens, with a gap interposed between the third lens and the second lens.

2. A projection lens that is mounted on a housing of a projection device including an electro-optical element, the projection lens comprising:
   a first holding part that holds a first optical system disposed along a first optical axis along which light emitted from the housing passes;
   a first reflective part that bends light parallel to the first optical axis to form light parallel to a second optical axis;
   a second reflective part that bends the light parallel to the second optical axis to form light parallel to a third optical axis; and
   a second holding part that holds the first reflective part and the second reflective part,
   wherein a distance along the first optical axis between a first lens, which is disposed to be closest to a reduction side in the first optical system, and the first reflective part is longer than a distance along the second optical axis between the first reflective part and the second reflective part,
   the first lens is a lens made of glass,
   the first optical system includes an aspherical third lens that is made of a resin material and is disposed between the first lens and the first reflective part, and
   wherein a diameter of an optical surface of the third lens is 1.3 to 2 times a diameter of an optical surface of the first lens.

3. The projection lens according to claim 1,
   wherein the first optical system forms an intermediate image of an optical image of the electro-optical element.

4. The projection lens according to claim 1,
   wherein
   $|1/f3|$ is smaller than $|1/f2|$ in a case where a focal length of the second lens is denoted by f2 and a focal length of the third lens is denoted by f3.

5. A projection lens that is mounted on a housing of a projection device including an electro-optical element, the projection lens comprising:
   a first holding part that holds a first optical system disposed along a first optical axis along which light emitted from the housing passes;

a first reflective part that bends light parallel to the first optical axis to form light parallel to a second optical axis;

a second reflective part that bends the light parallel to the second optical axis to form light parallel to a third optical axis; and a second holding part that holds the first reflective part and the second reflective part, wherein a distance along the first optical axis between a first lens, which is disposed to be closest to a reduction side in the first optical system, and the first reflective part is longer than a distance along the second optical axis between the first reflective part and the second reflective part, the first lens is a lens made of glass, the first optical system includes an aspherical third lens that is made of a resin material and is disposed between the first lens and the first reflective part, and wherein |1/f3| is 0.03 or less in a case where a focal length of the third lens is denoted by f3.

6. The projection lens according to claim 1, wherein
the second lens and the third lens are adjacent to each other.

7. The projection lens according to claim 1, wherein
a diameter of an optical surface of the third lens is larger than a diameter of an optical surface of the first lens and is smaller than a diameter of an optical surface of the second lens.

8. A projection lens that is mounted on a housing of a projection device including an electro-optical element, the projection lens comprising:

a first holding part that holds a first optical system disposed along a first optical axis along which light emitted from the housing passes;

a first reflective part that bends light parallel to the first optical axis to form light parallel to a second optical axis;

a second reflective part that bends the light parallel to the second optical axis to form light parallel to a third optical axis; and a second holding part that holds the first reflective part and the second reflective part, wherein a distance along the first optical axis between a first lens, which is disposed to be closest to a reduction side in the first optical system, and the first reflective part is longer than a distance along the second optical axis between the first reflective part and the second reflective part, the first lens is a lens made of glass, the first optical system includes an aspherical third lens that is made of a resin material and is disposed between the first lens and the first reflective part, and wherein the first optical system includes a stop portion that is disposed between the first lens and the third lens, and a distance between the stop portion and the third lens is longer than a distance between the stop portion and the first lens.

9. The projection lens according to claim 1, wherein the second holding part includes one holding frame that integrally holds the first reflective part and the second reflective part.

10. The projection lens according to claim 1, further comprising:

a second holding part-fixing mechanism that fixes the second holding part to the first holding part, wherein the second holding part is capable of being shifted relative to the first holding part in a case where a fixing force of the second holding part-fixing mechanism is reduced.

11. The projection lens according to claim 10, wherein the second holding part-fixing mechanism includes a male screw, a female screw that engages with the male screw, and a screw insertion hole into which the male screw is inserted, and the female screw is formed in any one of the first holding part or the second holding part, and the screw insertion hole is formed in the other thereof.

12. A projection device comprising:
the projection lens according to claim 1;
the electro-optical element; and
the housing.

13. The projection lens according to claim 2, wherein the first optical system forms an intermediate image of an optical image of the electro-optical element.

14. The projection lens according to claim 2, wherein the first optical system includes a second lens that is disposed to be closest to an enlargement side, and |1/f3| is smaller than |1/f2| in a case where a focal length of the second lens is denoted by f2 and a focal length of the third lens is denoted by f3.

15. The projection lens according to claim 3, wherein
|1/f3| is smaller than |1/f2| in a case where a focal length of the second lens is denoted by f2 and a focal length of the third lens is denoted by f3.

16. The projection lens according to claim 2, wherein |1/f3| is 0.03 or less in a case where a focal length of the third lens is denoted by f3.

17. The projection lens according to claim 3, wherein |1/f3| is 0.03 or less in a case where a focal length of the third lens is denoted by f3.

18. The projection lens according to claim 4, wherein |1/f3| is 0.03 or less in a case where a focal length of the third lens is denoted by f3.

19. The projection lens according to claim 2, wherein the first optical system includes a second lens that is disposed to be closest to an enlargement side, and
the second lens and the third lens are adjacent to each other.

20. The projection lens according to claim 3, wherein
the second lens and the third lens are adjacent to each other.

* * * * *